(12) United States Patent
Stephen (10) Patent No.: US 8,322,009 B2
(45) Date of Patent: Dec. 4, 2012

(54) APPARATUS AND METHOD FOR SEPARATING FLANGES

(75) Inventor: Robert Stephen, Aberdeenshire (GB)

(73) Assignee: Equalizer International Limited, Aberdeen (GB)

( * ) Notice: Subject to any disclaimer, the term of this patent is extended or adjusted under 35 U.S.C. 154(b) by 1059 days.

(21) Appl. No.: 11/922,709

(22) PCT Filed: Jul. 3, 2006

(86) PCT No.: PCT/GB2006/002473
§ 371 (c)(1),
(2), (4) Date: Nov. 10, 2008

(87) PCT Pub. No.: WO2007/003937
PCT Pub. Date: Jan. 11, 2007

(65) Prior Publication Data
US 2009/0087248 A1    Apr. 2, 2009

(30) Foreign Application Priority Data
Jul. 2, 2005    (GB) .................................. 0513613.0

(51) Int. Cl.
*B23P 19/00* (2006.01)
(52) U.S. Cl. ......................................... 29/426.1; 29/239
(58) Field of Classification Search ................ 29/426.1, 29/239
See application file for complete search history.

(56) References Cited

U.S. PATENT DOCUMENTS

| | | | | |
|---|---|---|---|---|
| 3,997,957 A * | 12/1976 | Tone et al. | ...................... | 29/239 |
| 4,015,324 A * | 4/1977 | Lutter | .............................. | 29/239 |
| 4,610,064 A * | 9/1986 | Verstraeten | ..................... | 29/239 |
| 5,129,136 A | 7/1992 | Richardson | | |

FOREIGN PATENT DOCUMENTS

| | | |
|---|---|---|
| DE | 25 22 817 | 5/1976 |
| GB | 524 244 | 8/1940 |
| GB | 2 286 635 | 8/1995 |
| NL | 8 003 882 | 2/1982 |

* cited by examiner

*Primary Examiner* — Derris Banks
*Assistant Examiner* — Azm Parvez
(74) *Attorney, Agent, or Firm* — Drinker Biddle & Reath LLP (57) ABSTRACT

A method and apparatus for separating or spreading flanges of pipes is disclosed and includes two bolt hole engaging devices and a force transmission system. The force transmission system selectively couples with a bolt hole engaging device and is capable of exerting a force thereon for selective movement of the flanges relative to one another. The bolt hole engaging device comprises an expandable member that is arranged to be at least partially accommodated within the bolt hole before expansion, and an expander means arranged to expand the expandable member such that at least a portion of an outer surface of the expandable member is expanded to contact the bolt hole. The expander means may include at least one wedge shaped member and an actuator means for causing relative movement between the wedge shaped member and the expandable member.

26 Claims, 13 Drawing Sheets

APPARATUS AND METHOD FOR SEPARATING FLANGES

RELATED APPLICATION

This Application is the U.S. National Phase Application of PCT International Application No PCT/GB2006/002473 filed Jul. 3, 2006.

FIELD OF THE INVENTION

This invention relates to apparatus and method for spreading flanges of pipes.

DESCRIPTION OF THE RELATED ART

Large diameter pipes are typically formed from a series of shorter pipe portions placed end to end. The portions of pipe are joined by bolting adjacent flanges that extend radially from the end of pipes to be joined. Bolts are inserted through holes in the flanges and typically a gasket is inserted between adjacent flanges before the bolts are used to draw the two flanges towards one another and create a substantially fluid-tight join. Gaskets occasionally require inspection or replacement and therefore there is an occasional need to access the area between adjacent flanges.

BRIEF SUMMARY OF THE INVENTION

According to a first aspect of the present invention there is provided apparatus for spreading flanges of pipes comprising:
  one or more bolt hole engaging devices and a force transmission system arranged for selective coupling with the or each bolt hole engaging device and capable of exerting a force thereon for selective movement of the flanges relative to one another,
  wherein the bolt hole engaging device comprises an expandable member arranged to be at least partially accommodated within the bolt hole before expansion and an expander means arranged to expand the expandable member such that at least a portion of an outer surface of the expandable member is expanded to contact the bolt hole.

The expandable member can be retained within a bolt hole by friction between the inner surface of the bolt hole and the outer surface of the expandable member, following expansion thereof within the bolt hole. The expandable member can optionally be provided with one or more friction-enhancing enhancing formations such as ridges extending radially outwardly, or other radial protrusions. The formations, ridges or other radial protrusions can be axially spaced along the outer surface of the expandable member, so that they are expanded into contact with the inner surface of the bolt hole at locations that are spaced along the axis of the bolt hole.

The expandable member typically has an inner bore to accommodate the expander device.

The expandable member can optionally comprise one or more tapered portions that can move relative to other portions of the member to radially expand the outer surface. The tapered and other portions moving relative to one another typically engage one another by means of bearing surfaces disposed between them. The bearing surfaces can be substantially planar or curved, and in most cases, the outer surface can be curved to match the inner surface of the bolt hole, which it engages.

The expandable member can comprise a generally cylindrical member having one or more slits extending through a sidewall thereof. The slits are typically parallel to one another and to the axis of the member. The slits are typically circumferentially spaced around the expandable member, and circumferentially adjacent slits typically extend from alternate ends of the member, so that the member can be expanded into a "zig-zag" configuration, with the elongate axial portions between the slits being interconnected at alternate ends of the member.

Preferably, one bolt hole engaging device can be used with several sizes of expandable members in order to engage different sizes of bolt holes. The different expandable members can typically have the same inner diameter and different outer diameters. Thus the bolt hole engaging device is adaptable and there is no requirement to have an entire device suitable for each particular bolt hole diameter.

The outer surface of the expandable member can typically be harder than the inner surface of the bolt hole. The expandable member can typically be made from mild steel which has been surface hardened.

The expander means can be arranged to exert a force on the expandable member to move the expandable member radially outwardly.

The expander means can comprise one or more frustoconical members and an actuator means to move the frustoconical member(s) relative to the expandable member. The frustoconical member can be arranged such that relative movement between frustoconical member and the expandable member causes the expandable member to expand. The angle of inclination of the tapered face of the frustoconical member(s) relative to the central axis thereof can be varied in order to adjust the amount of axial travel of the expander means or expandable member relative to the radial expansion of the expandable member. The frustoconical member can optionally have a substantially polygonal cross section.

The actuator means is provided to initiate relative movement of the frustoconical member and the expandable member. The actuator means can comprise a screw-threaded device. In some embodiments, the actuator means can act on the expandable member to urge it towards the larger diameter end of the frustoconical member. In other embodiments, it acts on the frustoconical member to move the frustoconical member relative to the expandable member, so that it moves farther into the bore of the expandable member, and radially expands the expandable member. Accordingly, a thread on one portion of the device and a nut having a corresponding thread can be driven relative to one another as an actuator means such the expandable member moves axially relative to the frustoconical member, and expands radially. The nut can have a collar which collar can be arranged to engage an end face of the expandable member.

The force transmission system can be coupled directly to the bolt hole engaging device. One bolt hole engaging device can be provided on each adjacent flange, in aligned bolt holes. The force transmission system can comprise two arms each connectable to a respective bolt hole engaging device at one end and to a driving mechanism at the other end. The driving mechanism can be a screw-threaded device that is capable of exerting an axial force to separate the two bolt hole engaging devices that are attached to the flanges, and thus to separate the flanges themselves. According to another embodiment of the invention the driving mechanism can comprise a hydraulic ram.

The force transmission system can be provided with a spacer bar connectable between pivot points on the arms. The length of the spacer bar can be adjustable to suit the distance between the flanges, and can be locked in a number of positions once the desired length has been determined.

The position of the pivot point on the arms can optionally be varied in order to change the lever ratio of the arms, and thereby modulate the amount of force applied to the bolt hole engaging device.

The force transmission system can be adjustable. The length of the spacer bar and the length of the driving mechanism can be adjustable to enable use of the force transmission system on a range of flange widths.

In certain embodiments, the force transmission system can be hydraulically operated. The bolt hole engaging device can have an axial bore to house a piston and form a hydraulic piston chamber for fluid to drive the piston relative to the device. The piston can be coupled to a driving pin that is coaxial with and retractable within the bore of the bolt hole engaging device. The driving pin can be driven out of the piston chamber by the force of the hydraulic fluid, out of the end face of the flange, and forced against the driving pin on the device located in the aligned bolt hole of the adjacent flange, or against another reaction surface. The driving pin can be provided with a protrusion or a recess on the end face that can be engaged with a recess or protrusion on the end face of the adjacent driving pin. This ensures that the driving pins are correctly aligned with respect to one another, and that the force exerted is perpendicular to the radial direction of the flanges. The protrusion and recess can be in the form of a ball and socket. The protrusion and recess can engage to prevent misalignment and shearing of adjacent driving pins.

According to a second aspect of the present invention there is provided a method for spreading flanges of pipes comprising the steps of:
providing a bolt hole engaging device comprising an expandable member;
arranging the expandable member at least partially within a bolt hole on a flange;
actuating an expander means to expand an outer surface of the expandable member into contact with the bolt hole;
providing a force transmission system to act on the bolt hole engaging device; and
actuating the force transmission system to exert a force on the bolt hole engaging device tending to move the flanges relative to one another.

The steps of the method can be repeated so that another bolt hole engaging device is positioned in the aligned bolt hole of the adjacent flange. The method steps can be repeated further so that an additional two devices can be positioned in aligned bolt holes separated by 180° around the flange. If required, several devices can be arranged in corresponding bolt holes around the flange.

The method can also include the step of providing a frustoconical expander means and driving the frustoconical expander means and the expandable member relative to one another, in order to expand the expandable member. This can be achieved by turning a nut on a screw thread, which nut can act on the frustoconical expander means to push it into the expandable member. Alternatively, the nut can act on the expandable member to move it relative to the expander means. The method can include calculating or measuring the force required to pull the bolt hole engaging device out of the bolt hole. This can be achieved by recording the number of turns of the nut along the screw thread, or by a torque-measuring tool used to apply a predetermined torque to the nut.

The or each expandable member can be provided with slits extending through a sidewall thereof. The method can include the step of increasing the friction between the expandable member and bolt hole by increasing the amount of surface area of the expandable member in contact with the bolt hole.

BRIEF DESCRIPTION OF THE DRAWINGS

Several embodiments of the present invention will now be described with reference to and as shown in the accompanying drawings, in which:—

FIG. 10a is a side view of a force transmission system attached to the bolt hole engaging device of FIG. 7a;

DETAILED DESCRIPTION OF THE INVENTION

Figure 1:
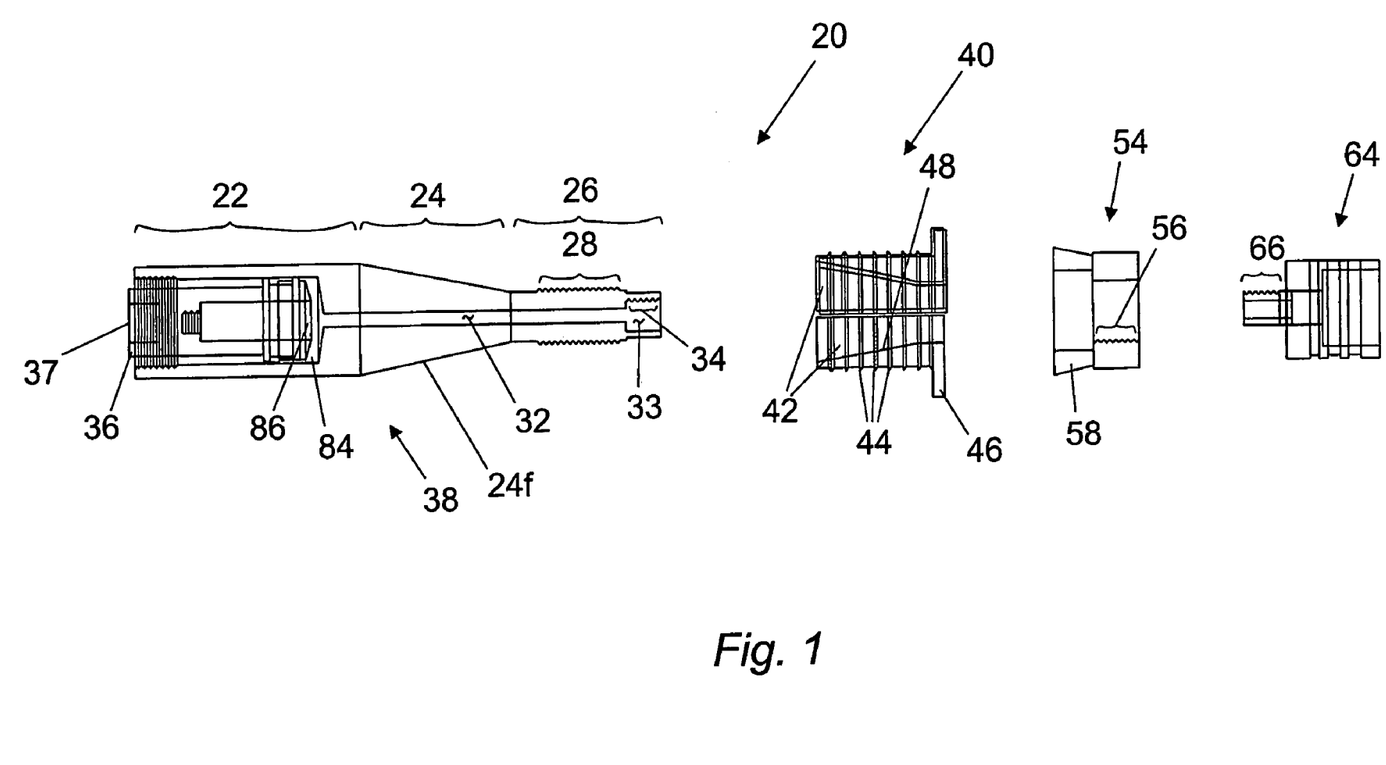
FIG. 1 is a sectional side exploded view of a bolt hole engaging device in accordance with one embodiment of the present invention.

According to one embodiment of the present invention, component parts of a bolt hole engaging device, indicated generally at 20, are shown in an exploded view in FIG. 1. The bolt hole engaging device 20 comprises a body portion 38 that forms part of an expander means, a collet 40, which acts as an expandable member, a nut 54 and an end cap 64.

The body portion 38 includes a first end portion 22 and a second end portion 26 with a frustoconical portion 24 therebetween. The large diameter end of the frustoconical portion 24 is contiguous with the first end portion 22 and the small diameter end of the frustoconical portion 24 is contiguous with the second end portion 26.

The first end portion 22 houses a hydraulic system. The hydraulic system includes an open-ended chamber 84 in which a piston 86 is sealed. The piston 86 is moveable within the chamber 84 to drive corresponding movement of a driving pin 36 protruding from the open end of the chamber 84. The second end portion 26 is provided with a screw thread 28 on its outer surface. The frustoconical portion 24 and the second end portion 26 have a continuous bore 32 extending therethrough to allow hydraulic fluid to be transmitted from an external supply to the chamber 84. The bore 32 within the second end portion 26 has an enlarged portion 33, the inner surface of which is provided with a thread 34.

The collet 40 has a substantially cylindrical outer shape and is made up from four separate segments 42. Each segment 42 has a number of mutually parallel circumferential ridges 44 protruding radially from its outer surface and a lip 46 extending radially outwardly from one end. An inner surface 48 of the collet 40 is substantially frustoconical in shape and the profile of the inner surface matches a portion of the outer surface of the small diameter end of the frustoconical portion 24.

The nut 54 is provided with a collar 58 attached thereto and has an inner thread 56 matching the thread 28 on the second end portion 26. The end cap 64 bears a hydraulic connector, and is also provided with a thread 66 that matches the thread 34.

Figure 2A:
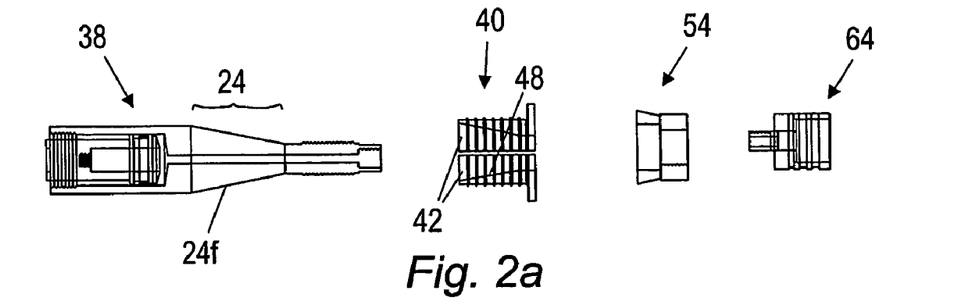
FIG. 2a to 2c are sectional side views showing the device of FIG. 1 in progressive stages of assembly.
Figure 2B:
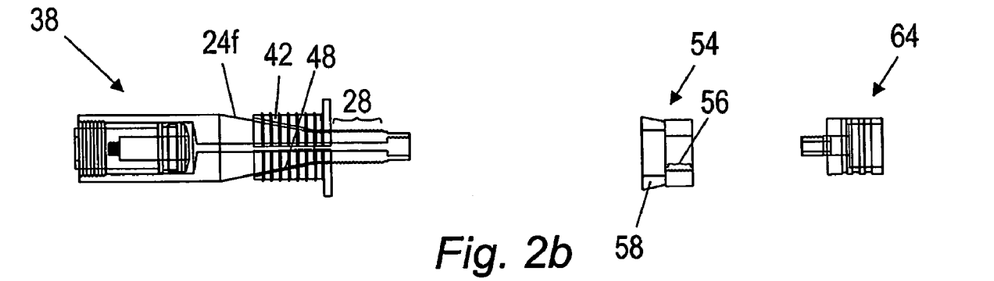
Figure 2C:
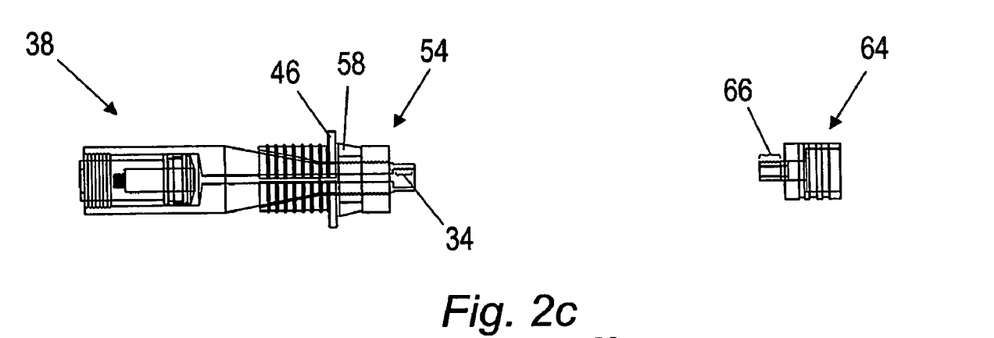
Figure 3:
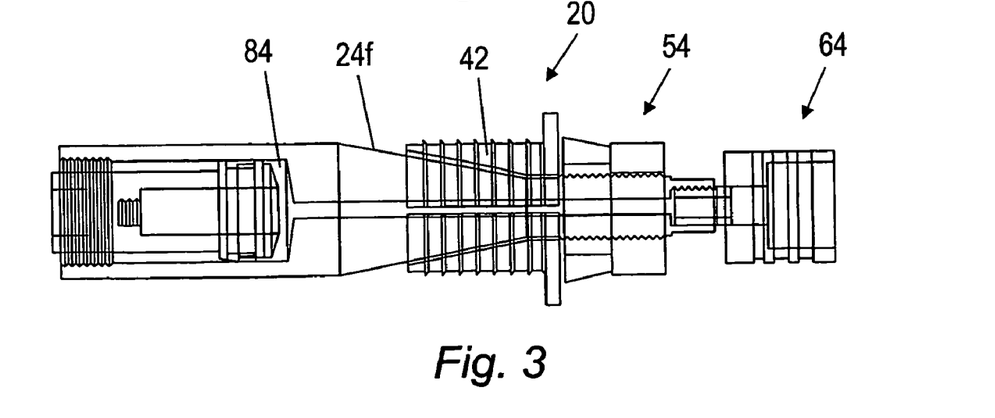
FIG. 3 is a sectional side view of the assembled device of FIG. 1.

FIGS. 2a to 2c show the bolthole engaging device 20 in various stages of assembly. As shown in FIG. 2b, the collet 40 fits over the second end portion 26. The taper on the conical inner surface 48 of the collet 40 matches the taper on the outer face 24f of the frustoconical portion 24, so that the two surfaces 48, 24f can bear against one another so that the collet 40 is fully supported by the portion 24. The nut 54 can then be assembled over the second end portion 26 and the threads 56 and 28 engaged. When the nut 54 is at the position shown in FIG. 2c, close to the open end of the thread 28, the collar 58 is pressed lightly against the lip 46 of the collet 40, the faces 24f and 48 are lightly pressed against one another, and the collet 40 is unexpanded. In the final stage of assembly, the end cap 64 is fixed to the body portion 38 by engaging the threads 66 and 34 at the enlarged portion 33 at the end of the bore 32. FIG. 3 shows the assembled bolt hole engaging device 20.

Figure 4A:
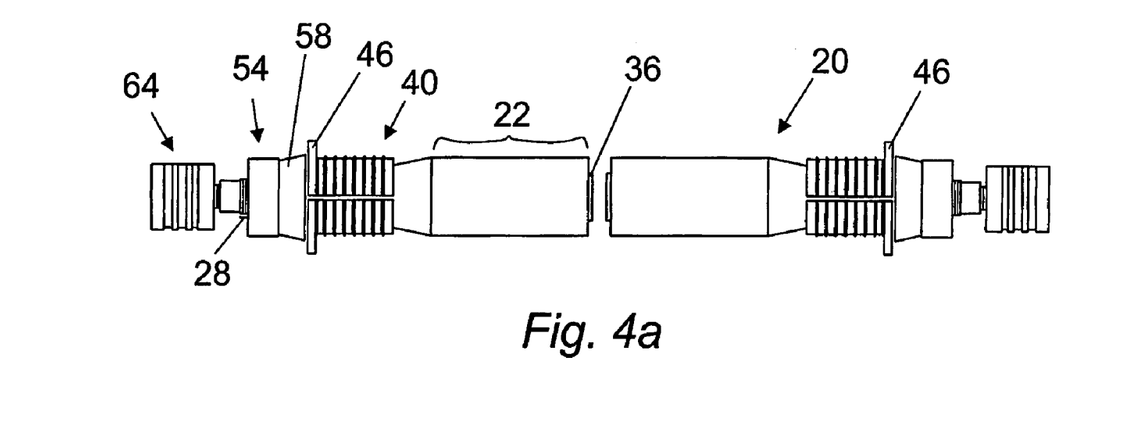
FIG. 4a is a side view of two adjacent devices of FIG. 3.
Figure 4B:
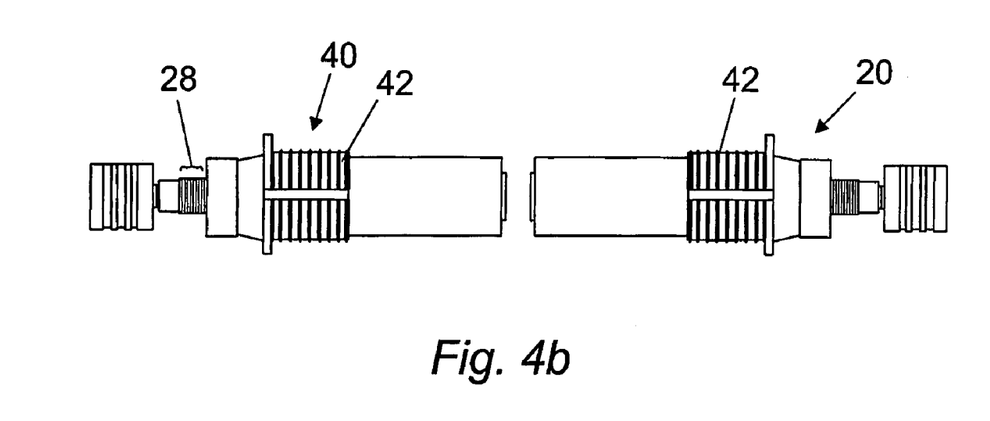
FIG. 4b is a side view of the devices of FIG. 4a with an expanded collet.

FIG. 4a shows two adjacent bolt hole engaging devices 20 facing one another in the position in which they would be located when assembled (but not expanded) within aligned bolt holes in adjacent flanges. When the devices are in place, the lips 46 of the collets 40 are pressed against the outer surfaces of the flanges, and the unexpanded collets 40 would be located within the bolt holes. When the collet 40 is to be expanded, the nut 54 is driven along the thread 28 relative to the collet 40. The collet 40 is of course held stationary relative to the flange by the lip 46 being pressed hard against the outer surface of the flange. As the nut 54 moves along the thread 28, the collar 58 reacts against the lip 46 of the stationary collet 40 and pulls the frustoconical portion 24 through the bore of the collet 40. The tapered surfaces 24f and 48 slide against one another, and the relative axial movement is translated into radial separation of the collet segments 42. The nut 45 is driven in this manner until the collet expands to the desired extent to lock the device 20 within the bolt hole.

FIGS. 5a to 5e show the steps involved in engaging bolt holes in order to separate two adjacent flanges 70. Portions of pipeline 76 are provided with flanges 70 extending radially therefrom at each end. Adjacent flanges 70 are joined by bolts (not shown) positioned in bolt holes 72 on each flange. There is a small initial gap 74 between adjacent flanges 70. A gasket (not shown) is usually positioned in the gap 74 between adjacent flanges 70, normally radially inside the bolt holes 72.

Figure 5A:
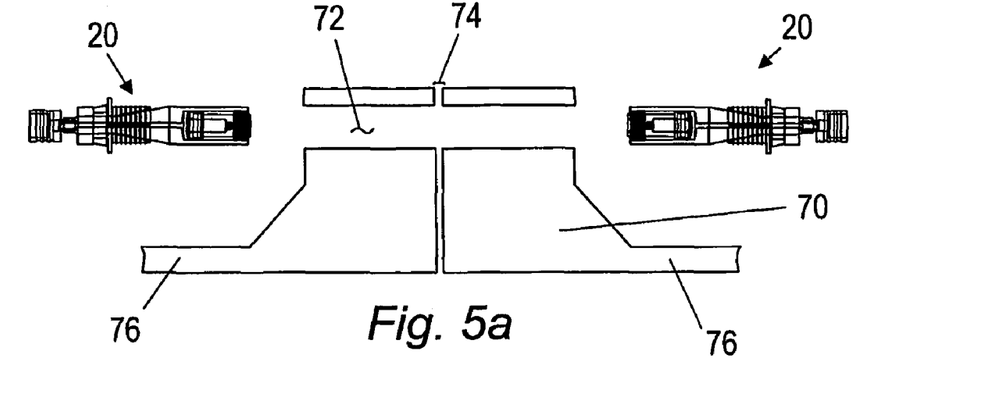
FIGS. 5a to 5e are sectional views showing progressive stages of insertion of the device of FIG. 3 into empty aligned bolt holes to achieve separation of flanges.
Figure 5B:
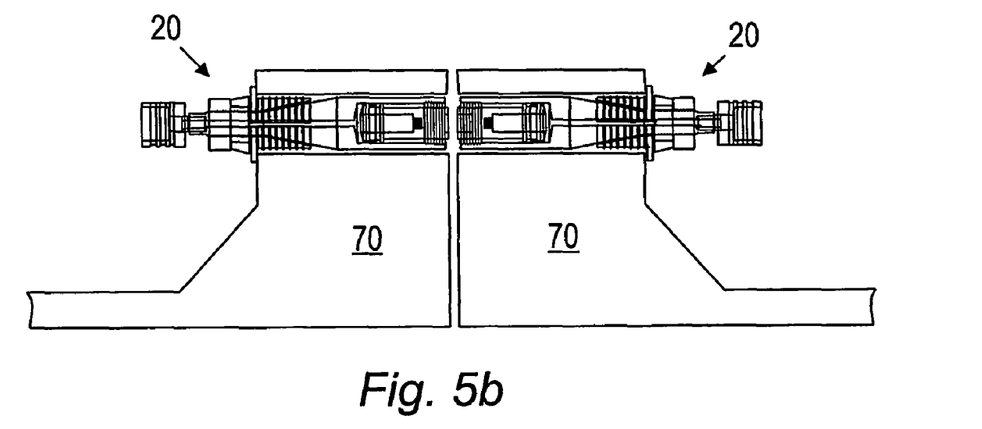
Figure 5C:
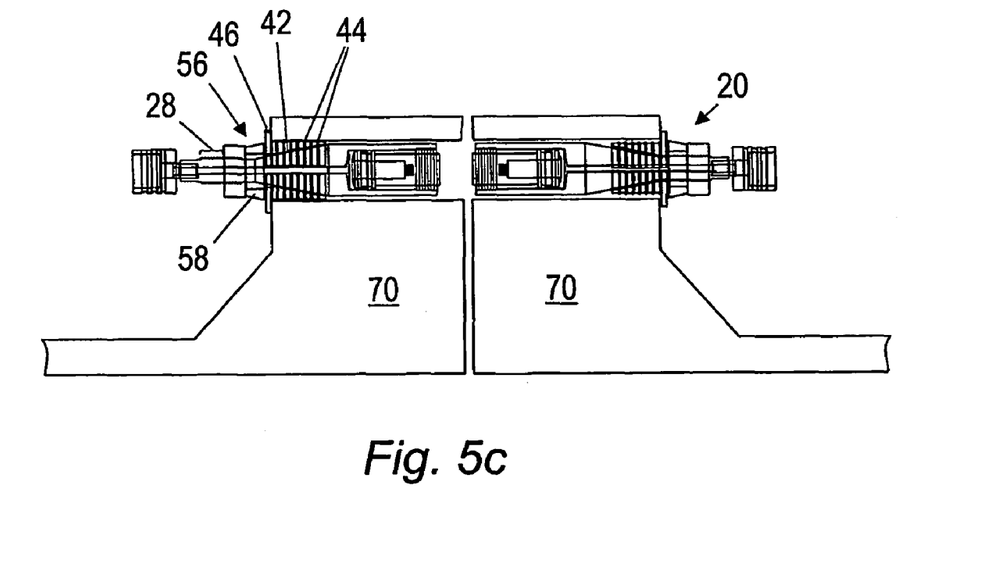
Figure 5D:
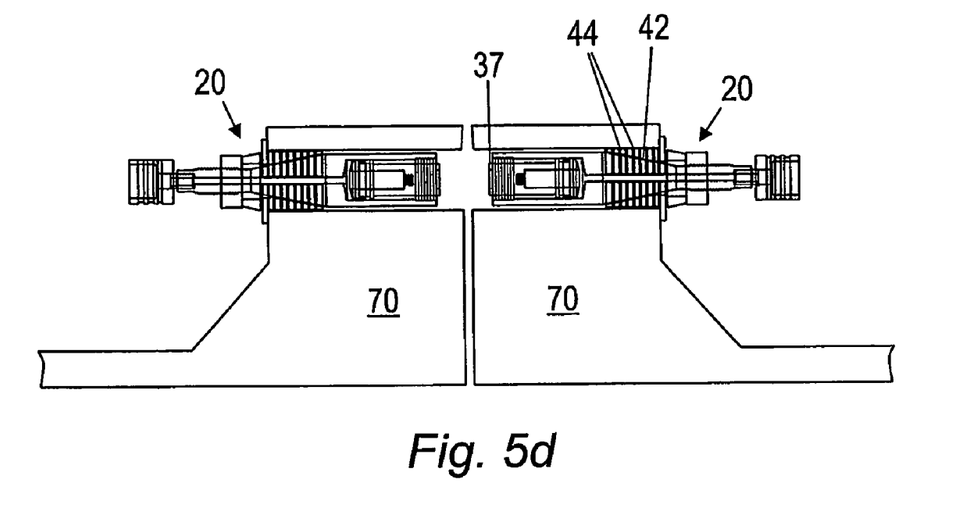

The first step in the method of separating the flanges 70 is to position a bolt hole engaging device 20 within each bolt hole 72. Once the bolt hole engaging devices 20 are located within the bolt holes 72, the collets 40 may then be expanded as shown in FIGS. 5c and 5d by driving the nut 56 along the thread 28. This drives the outer surface of segments 42 radially outwards against the inner surfaces of the bolt holes 72, and relative movement between the bolt holes 72 and the collets 40 is restrained by friction due to the expanded surface area of the collet 40 and formations 44 on the outer surface thereof gripping the inner surface of the bolt hole 72, adopting the configuration shown in FIG. 5d.

Figure 5E:
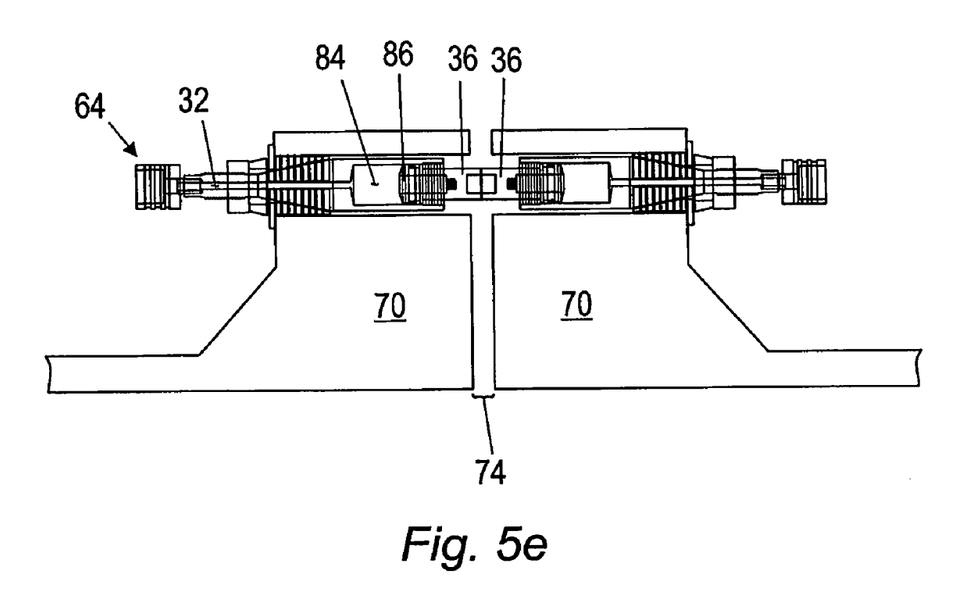
Figure 6A:
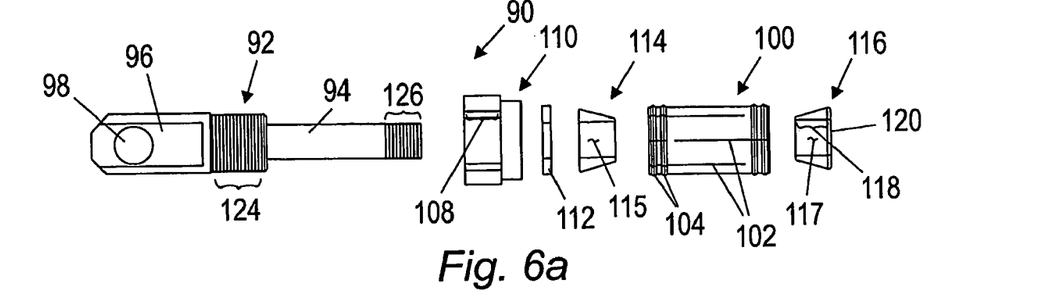
FIGS. 6a to 6e are side views of progressive stages of assembly of a bolt hole engaging device according to another embodiment of the present invention.
Figure 6B:
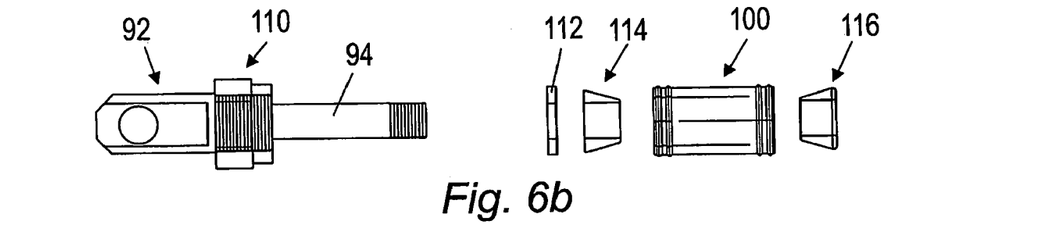
Figure 6C:
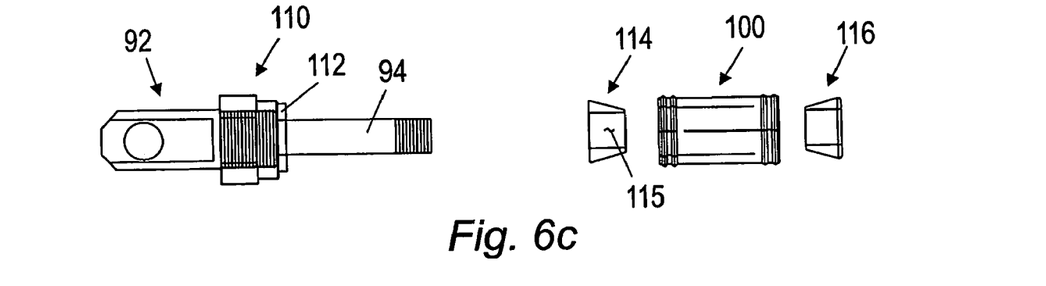
Figure 6D:
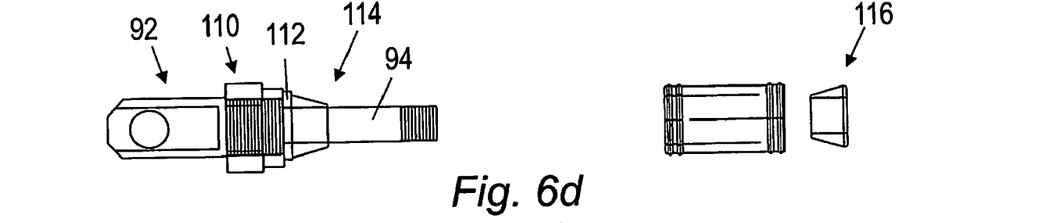
Figure 6E:
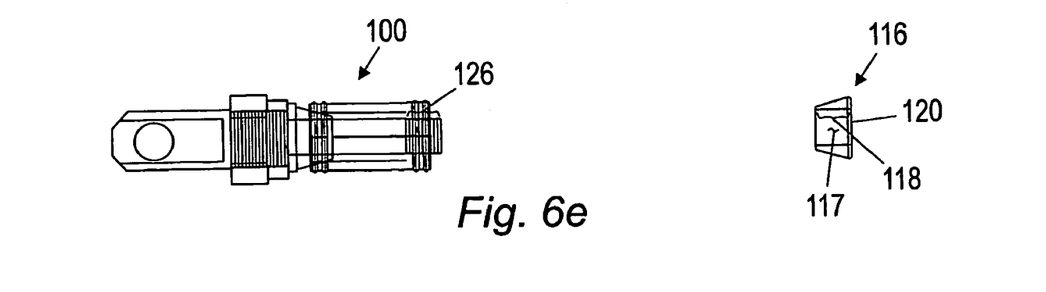

In order to separate the flanges 70, a supply of hydraulic fluid under pressure (not shown) is attached to the end cap 64 and hydraulic fluid is pumped down the bore 32 and into the chamber 84. The hydraulic fluid within the chamber 84 acts on the seals of the piston 86 to move the piston 86 out of the chamber, and to push mating faces 37 of the driving pins 36 into contact with one another. The opposing forces push the mating faces 37 of the driving pins 36 apart, and widen the gap 74 between the flanges 70 as shown in FIG. 5e.

As the nut 56 is turned along the thread 28, the precise number of revolutions of the nut 56 can be measured. Since the collet typically behaves in a predictable way and expands in a consistent manner, the measured number of revolutions can be used to calculate the pull-out force of the bolt hole engaging device 20. The calculated pull-out force of the bolt hole engaging device 20 can be adjusted to exceed the force applied by the hydraulic pressure to each driving pin 36, so that the hydraulic pressure acting to separate the flanges 70 does not pull the devices 20 out of the bolt holes 72. Alternatively, the torque on the nut 54 can be measured by a conventional torque wrench, and the desired pull out force can be calculated from that indication.

The lip 46 provides a surface against which the collar 58 provided on the nut 54 can react. Furthermore; the lip 46 is generally radially wider than the bolt hole 72. Therefore, the lip 46 optionally acts as an indicator to the user of the bolt hole engaging device 20, to limit the depth of insertion of the collet into the bolt hole and maintain the required distance into the bolt hole 72. However, the lip 46 is an optional feature, and it can be omitted, with the collet being able to penetrate entirely into the bolt hole and be expanded at any desired axial position therein.

According to another embodiment of the invention shown in FIGS. 6 to 11, an alternative bolt hole engaging device is shown generally at 90. The device 90 comprises a body portion 92, a nut 110, a washer 112, a first frustoconical member 114, a collet 100 and a second frustoconical member 116.

The body portion 92 comprises a pin 94 having a head 96 at one end and an external thread 124 provided therebetween. At the other end of the pin 94, a thread 126 is provided. The head 96 has two cylindrical protrusions 98 extending laterally from opposing sides thereof.

The nut 110 has an internal thread 108 that cooperates with the external thread 124 on the body portion 92.

The first frustoconical member 114 is provided with a throughbore 115, which is of a diameter sufficient to accommodate the pin 94. The second frustoconical portion 116 is similar to the first frustoconical position 114 and has a throughbore 117. The inner surface of the throughbore 117 is provided with a thread 118. At the larger diameter end of the second frustoconical portion 116, an end stop 120 is provided to prevent the pin 94 from protruding beyond the second frustoconical portion 116.

Figure 11:
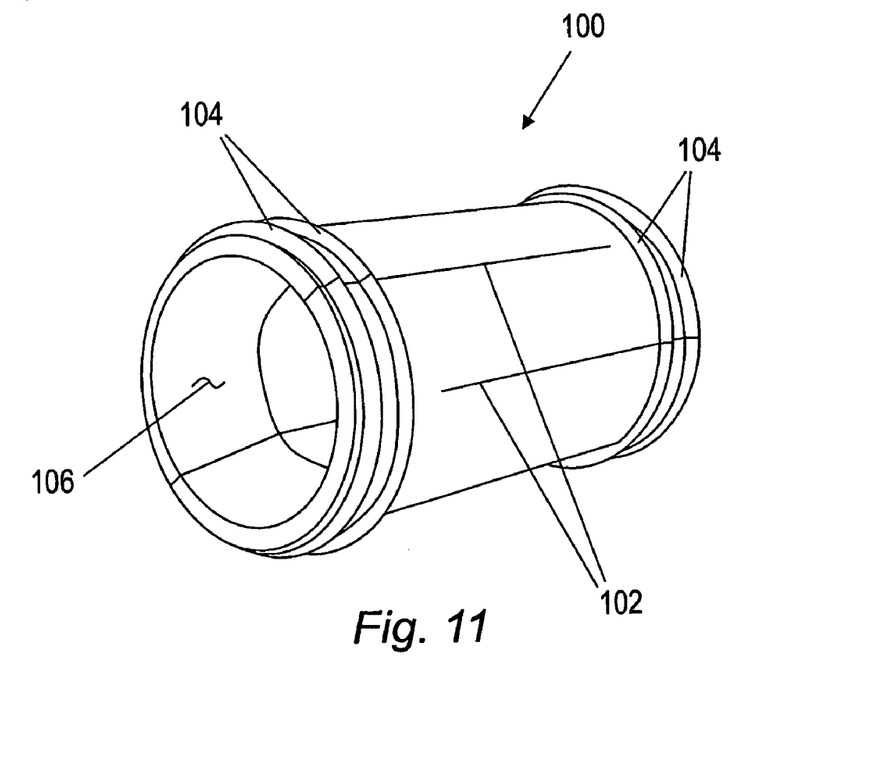
FIG. 11 is a perspective view of an unexpanded collet.

A detailed perspective view of the collet 100 is shown in FIG. 11. The collet 100 has a throughbore 106 and is provided with axial slits 102 extending from one end towards the other end of the collet 100. Each slit 102 is blind-ended, and extends from one end of the collet 100 to a position just short of the other end. The slits 102 are arranged at 45° intervals around the circumference of the collet 100, and adjacent slits extend from alternate ends of the collet 100. The end portions of the collet 100 are provided with radial protrusions 104 on the outer surface.

Figure 7A:
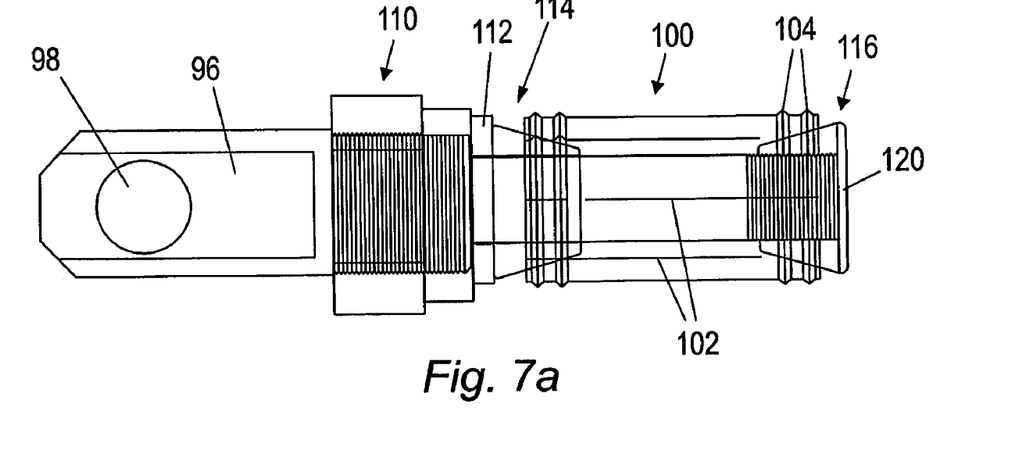
FIG. 7a is a side view of the device shown in FIG. 6e.

Assembly of the bolt hole engaging device 90 is shown from FIGS. 6a to 6e. The nut 110 is inserted over the pin 94 and the thread 108 engages with the corresponding thread 124. Once the nut 110 is in position, the washer 112 is inserted over the pin 94. The first frustoconical portion 114 is assembled such that the pin 94 is positioned within the throughbore 115, with the wide end of the first frustoconical portion 114 being offered to the pin first, so that the narrow end faces outwards. The collet 100 is also offered to the pin 94 so that the pin is co-axial with the throughbore 106 of the collet 100. An end portion of the collet 100 contacts and partially overlays part of the small diameter end of the first frustoconical member 114. The second frustoconical member 116 is screwed onto the end of the pin 94 via the co-operating threads 126 and 118, but is reversed with respect to the first frustoconical portion 114, so that the small diameter ends of the two frustoconical portions 114, 116 face one another, and are received within respective ends of the throughbore 106 of the collet 100. The end stop 120 prevents the pin 94 from protruding beyond the second frustoconical portion 116. The assembled bolt hole engaging device 90 is shown in FIG. 7a, in its unexpanded configuration.

Figure 7B:
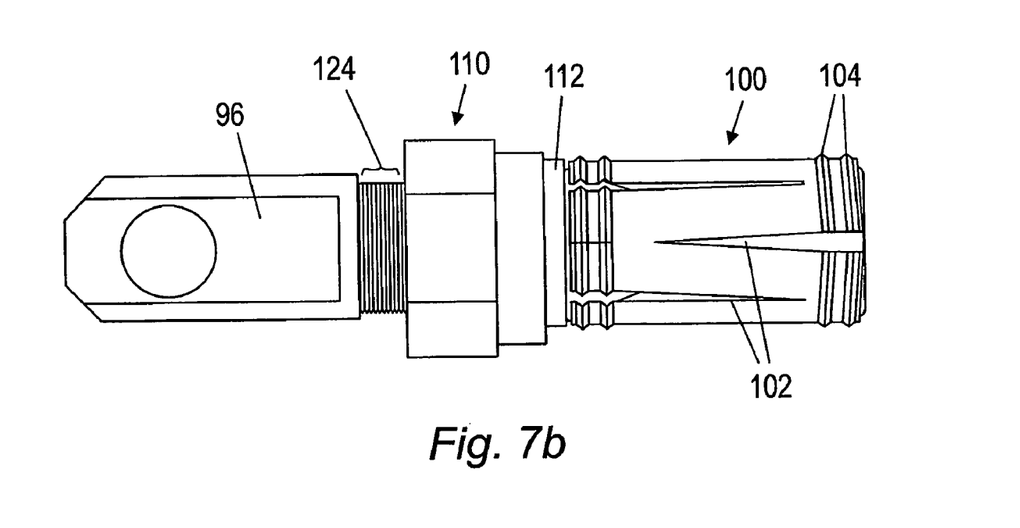
FIG. 7b is a side view of the device of FIG. 7a with the collet partially expanded.

In order to expand the collet 100, the nut 110 is driven along the thread 124 to urge the washer 112 and the first frustoconical member 114 towards the second frustoconical member 116. This action forces the frustoconical members 114, 116 into respective ends of the collet 100 so that the collet 100 engages the tapered inner surfaces of the frustoconical members 114, 116. As the frustoconical members 114, 116 are driven into the ends of the collet 100, the portion of the inner diameter of the members 114, 116 in contact with the collet 100 becomes progressively larger. The resultant expansion force on the collet 100 causes the slits 102 to separate at the ends of the collet 100, thereby expanding the collet 100.

Alternatively, the collet 100 could be replaced with a segmented collet similar to that described for the first embodiment and having an inner tapered surface at each end of the segment, which tapered surface is substantially complementary with the angle of taper of the frustoconical portions. Indeed, the expandable member of any of the embodiments described herein (e.g. the collets 40, 100, 196 and 240) can be used interchangeably with any expander device. In particular, the expandable collet 100 is especially suited for use with any embodiment of expander device.

Figure 8A:
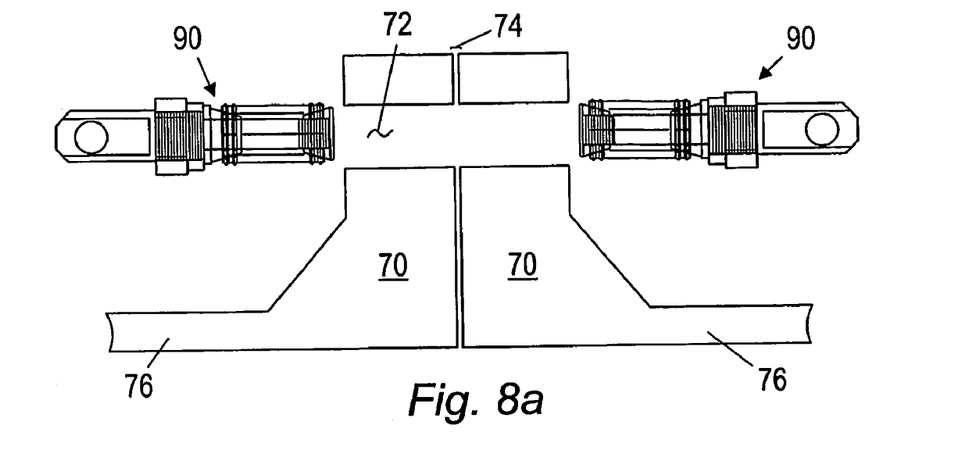
FIGS. 8a to 8c are sectional views of progressive stages of insertion of the device shown in FIG. 6e into empty aligned bolt holes.
Figure 8B:
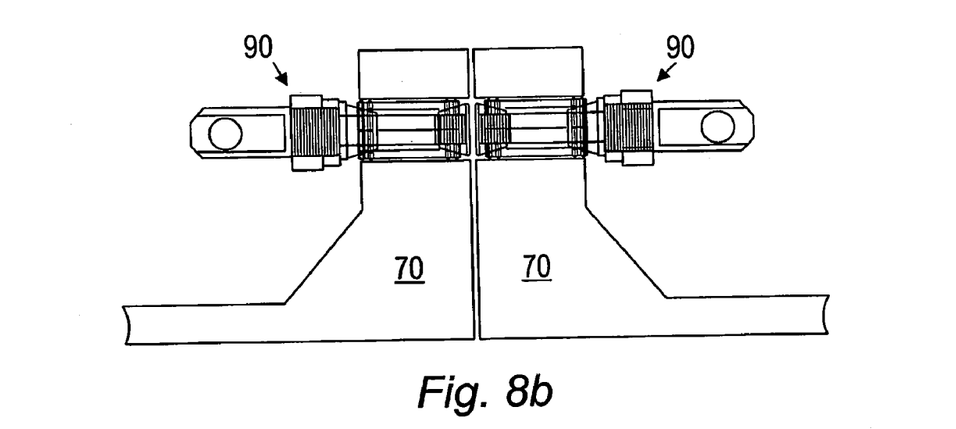
Figure 8C:
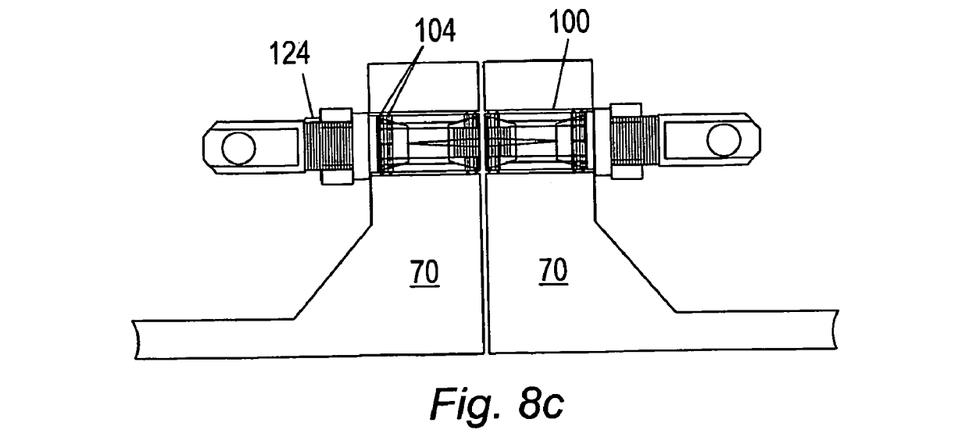

As described for the previous embodiment, the flanges 70 shown in FIGS. 8 and 9 are provided to join portions of pipeline 76 and have a bolt hole 72 and a small gap 74 therebetween. FIGS. 8a to 8b show the bolt hole engaging devices 90 being inserted into the adjacent bolt holes 72 and the collet 100 expanded in the manner previously described such that the formations 104 and a substantial proportion of the outer circumference of the collet 100 is in contact with the bolt hole 72.

Figure 9A:
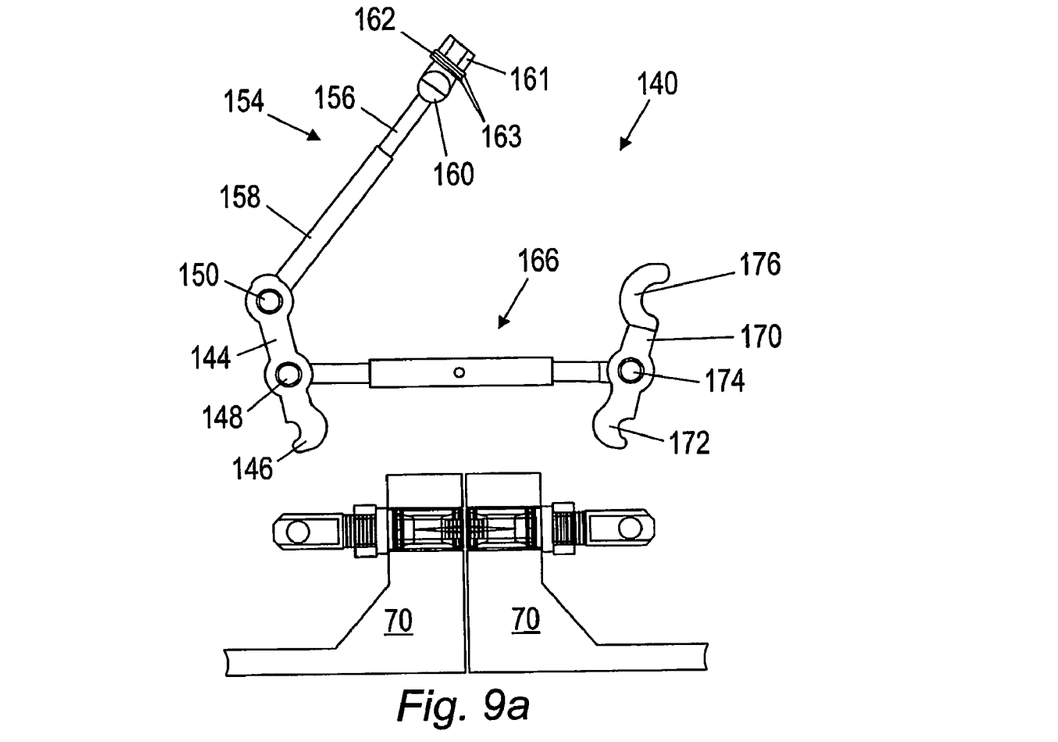
FIGS. 9a and 9d are sectional side views showing the progressive stages of coupling a force transmission system to the bolt hole engaging device and separating adjacent flanges.
Figure 9B:
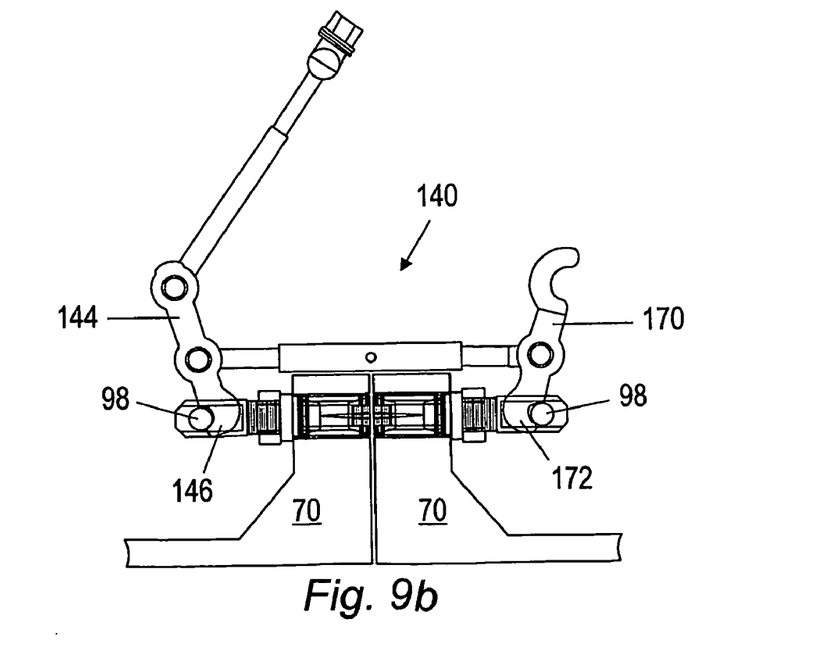
Figure 9C:
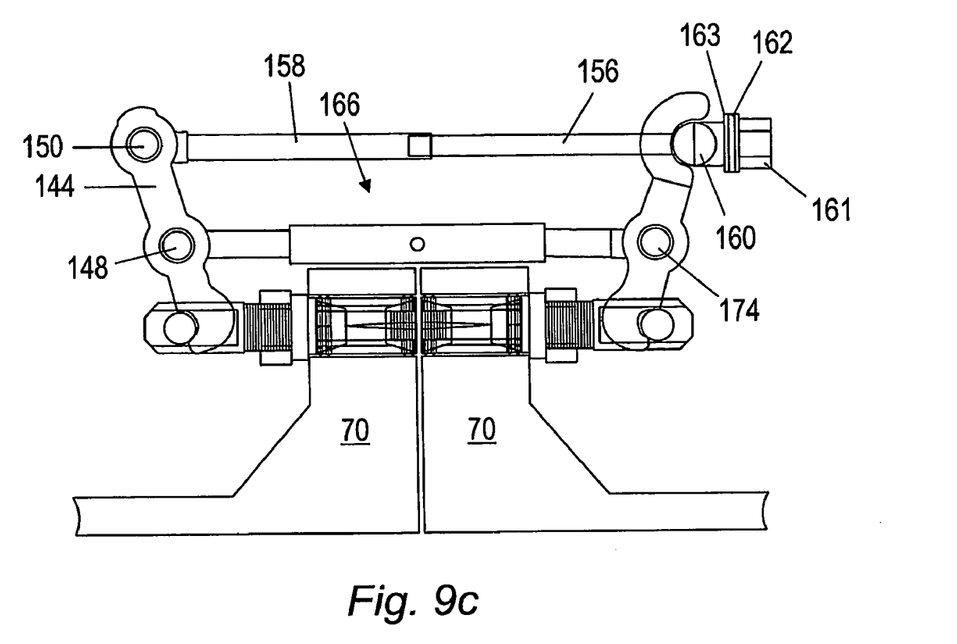
Figure 9D:
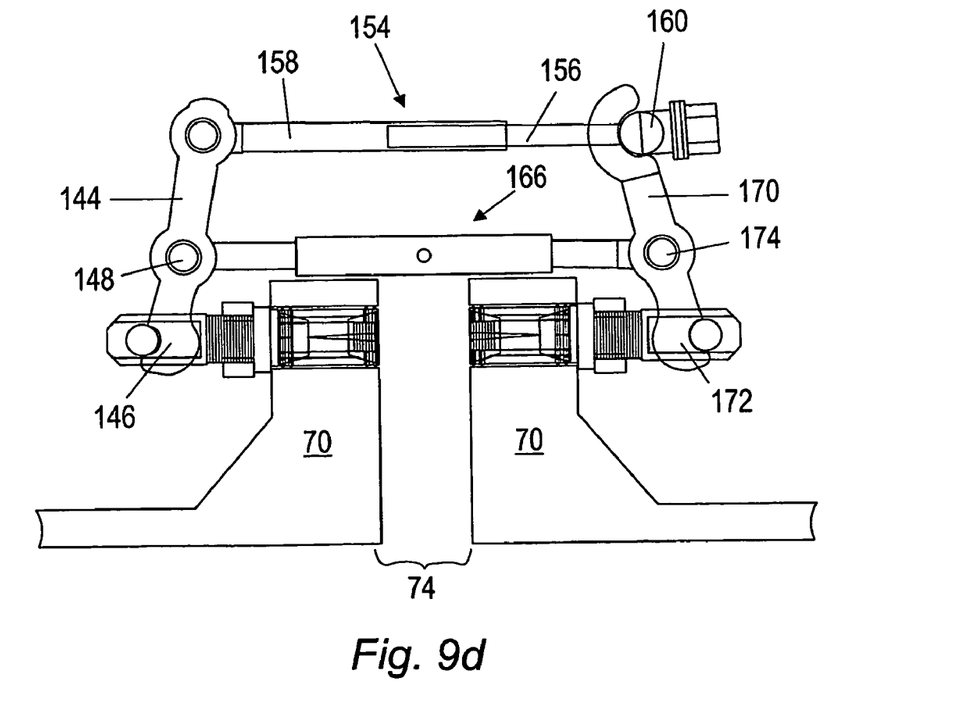
Figure 10A:
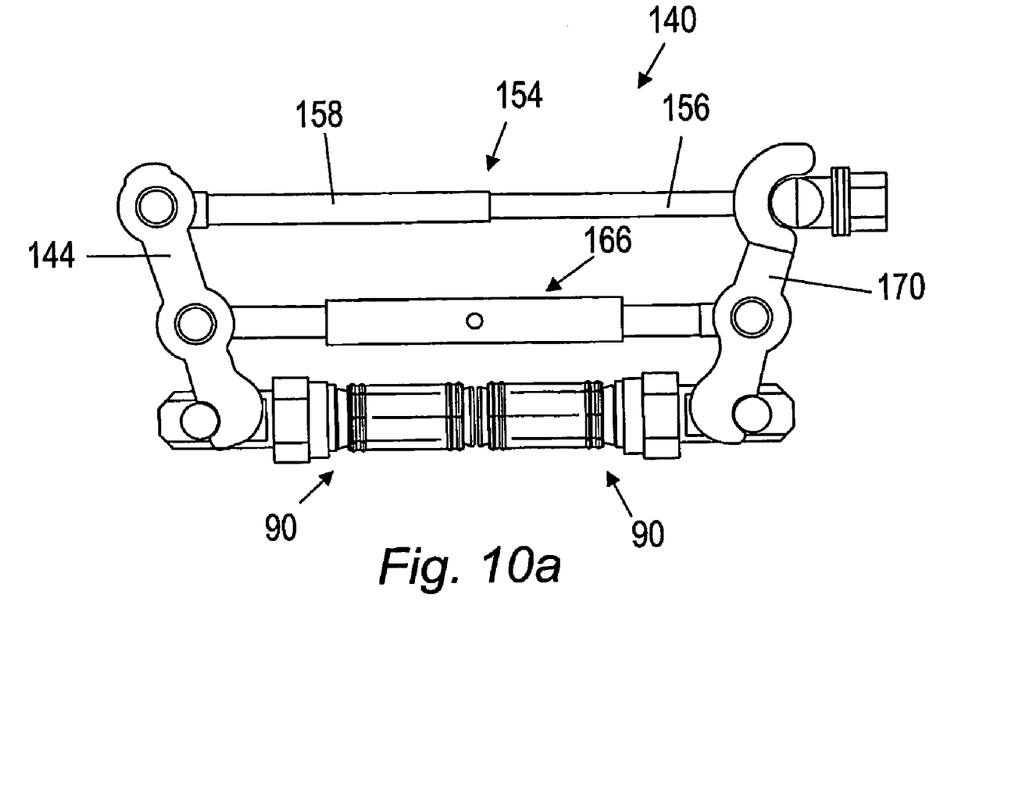
Figure 10B:
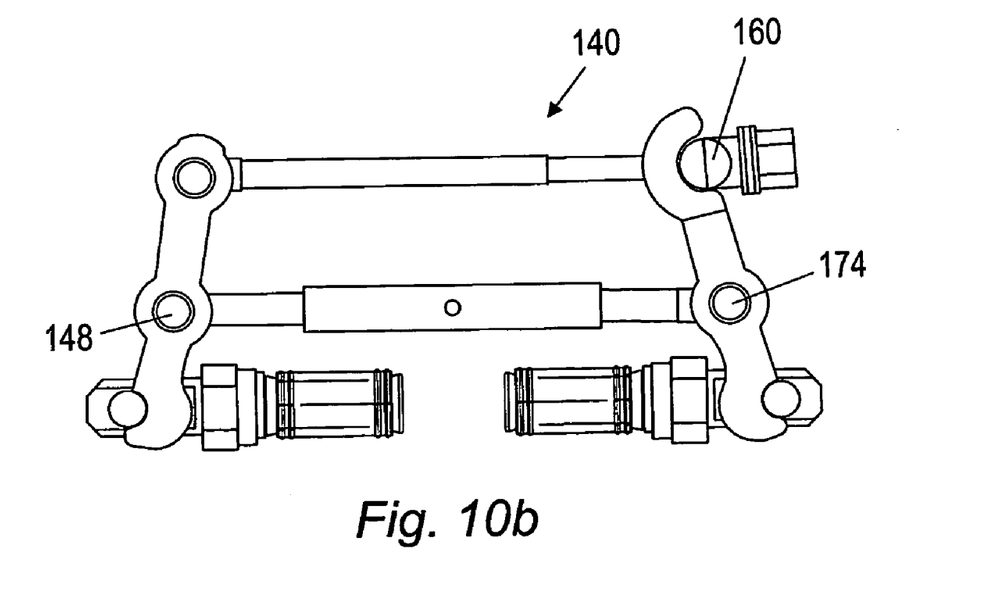
FIG. 10b is a side view of the force transmission system of FIG. 10a after a force has been applied to the bolt hole engaging device.

FIGS. 9 and 10 show a force transmission system 140. The force transmission system 140 comprises a drive mechanism 154, a spacer bar 166 and two arms 144, 170. The first arm 144 has a hooked portion 146 at its lower end, and at its upper end the arm 144 is pivotally connected to the drive mechanism 154 by pivot pin 150. The second arm 170 has a lower hooked portion 172, and a hook 176 at the upper end of the arm 170. A spacer bar 166 is pivotally connected between the arms 144, 170 at respective pivot pins 148 and 174, located between the two ends of each arm 144, 170.

The drive mechanism 154 has a tube 158 that is internally threaded to receive a threaded bolt 156. The bolt 156 is axially moveable with respect to the tube 158 by means of the threads (not shown). One end of the bolt 156 is provided with a head 160 to retain the end of the bolt 156 in the hook 176 of the arm 170. The bolt 156 terminates in a nut 161 that is used to apply torque to the bolt 156. A thrust bearing 162 is positioned between the head 160 and the nut 161. The thrust bearing 162 has a washer 163 on each side thereof.

The force transmission system 140 is attached to the bolt hole engaging devices 90 by positioning the hooks 146, 172 around the protrusions 98 as shown in FIG. 9b. The drive mechanism 154 is then pivoted around the pivot pin 150 into a position parallel with the spacer bar 166 and the head 160 locates in its seat on the outer side of the hook 176. The nut 161 of the bolt 156 is then turned to drive the bolt 156 into the tube 158 and draw the ends of the arms 144, 170 closer together. As the nut 161 is turned, the thrust bearing 162 reduces the amount of torque required to drive the nut 161 and spread the flanges. Since the spacer bar 166 is maintained in position throughout the operation, the arms 144, 170 pivot around pivot pins 148, 174 and push the lower hooked ends 146, 172 outwards. This separates the flanges 70 as shown in FIG. 9d.

The positioning of the spacer bar 166 can be altered to vary the direction of movement of the bolt hole engaging devices 90 or to vary the force applied to them. A shorter length between the hooked ends 146, 172 of the arms 144, 170 and the pivot points 148, 174 and a relatively longer length between the pivot points 148, 174 and the ends 150, 176 attached to the drive mechanism 154 results in a greater force being applied to the bolt hole engaging devices 90. However, the path followed by the ends 146, 172 of the arms 144, 170 tends to be more arcuate with smaller distances between the pivot points 148, 174 and the ends 146, 172. Thus the ratio of the distance between the end of each arm 144, 170 and the pivot points 148, 174 can be varied in order to control the force applied, and the radius of movement of the devices 90.

Alternatively, a fixed length bar 166 can be provided. According to this simplified embodiment, in order to cater for different widths of flange 70, several nuts 110 having different lengths of collar can be provided so that the correct length of collar can be selected depending on the distance between adjacent flanges 70. This ensures that the tool is adaptable to be used on different flange widths without changing the length of the spacer bar and enabling the collet to be correctly positioned within the bolt hole 72. Also, several different lengths of engaging devices 90 can be supplied, optionally with expander devices lacking the optional lip 46, so that the devices can be inserted into the bolt holes 72 and expanded at any required depth to suit the width of the flanges. Thus, with a wide flange, the collet can be inserted deep into the bolt hole before being expanded close to the inner end of the bolt hole, without having to adjust the spacer bar 166. Likewise, with a narrow flange, the collet can be inserted just inside the outer end of the bolt hole before being expanded closer to the outside of a smaller flange, again without having to adjust the position of the spacer bar 166.

Rather than driving the expanded bolt hole engaging devices 90 apart using drive mechanism 154 having the internally threaded tube 158 which receives the bolt 156, the force transmission system 140 can use a hydraulic system. The hydraulic system can comprise a piston retractably accommodated within a chamber. A supply of hydraulic fluid from an external source can be used to fill the chamber and push the piston axially outwardly so that it acts to separate the arms 144, 170 in the same manner as the tube 158 and bolt 156.

This system allows accurate monitoring of the force applied to the bolt hole engaging devices 90, and higher forces can be applied.

Figure 12:
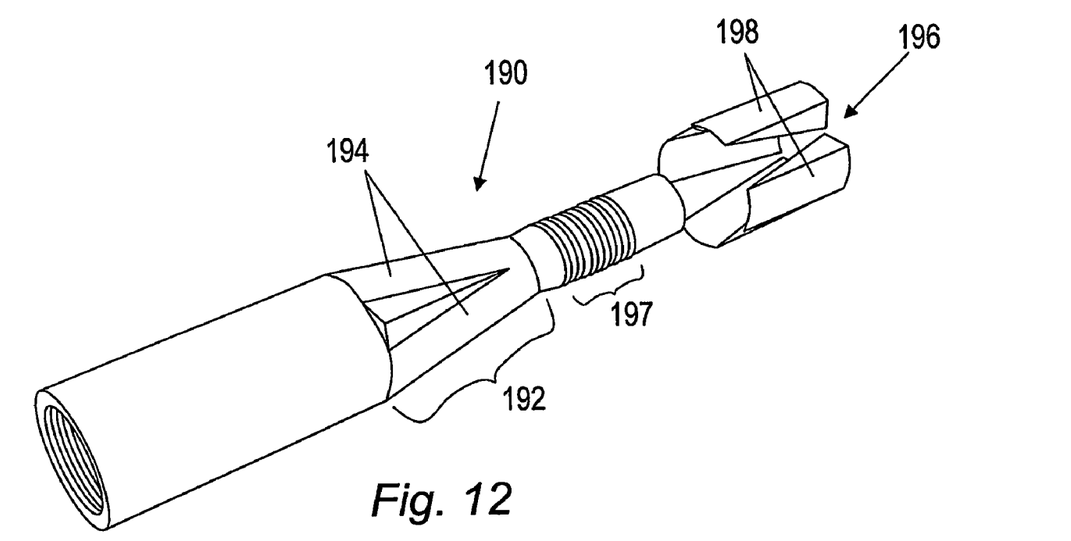
FIG. 12 is an exploded perspective view of another embodiment of part of a bolt hole engaging device in accordance with the present invention.

An alternative embodiment is shown in FIG. 12, which is a perspective view of part of a bolt hole engaging device 190. The bolt hole engaging device 190 comprises a frustoconical portion 192. The frustoconical portion 192 has four outer faces 194. A collet 196 is provided in four segments 198. The profile of the inner face of the segments 198 matches the profile of the outer faces 194 of the frustoconical member 192.

The embodiment shown in FIG. 12 is a partial hybrid between the first described hydraulic embodiment and the second described mechanical embodiment. The particular embodiment in FIG. 12 is mechanically driven by advancing a nut (not shown) along the threads 197. However, the collet 196 is segmented. Also, the tapered bearing surfaces between the collet 198 and the frustoconical portion are flat, rather than conical.

Figure 13:
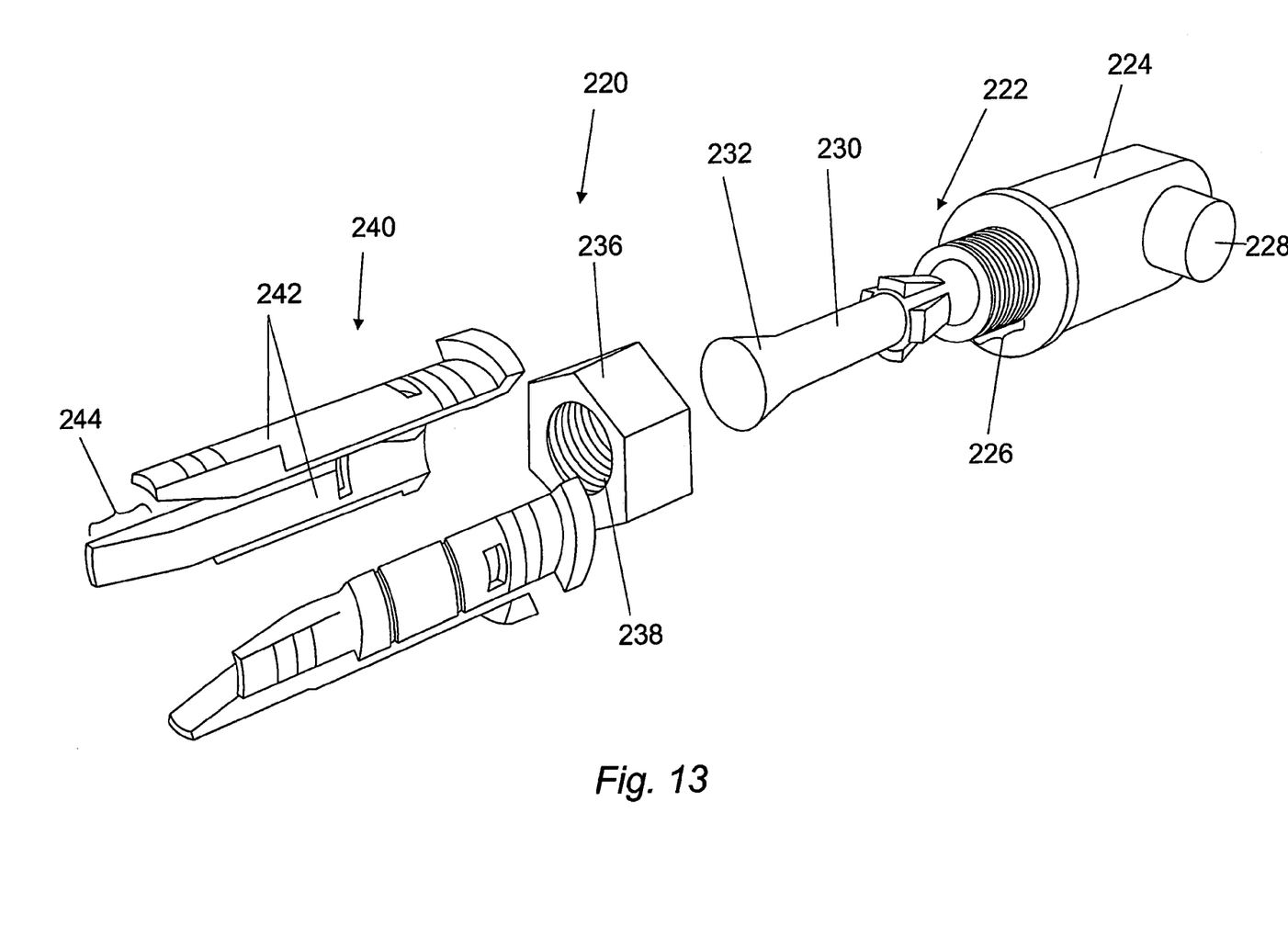
FIG. 13 is an exploded perspective view of an alternative embodiment of a bolt hole engaging device according to the invention.

Similarly, FIG. 13 is an alternative embodiment that combines different aspects of the embodiments previously described. An exploded perspective view of the bolt hole engaging device 220 is shown in FIG. 13. The device 220 comprises a body portion 222, a nut 236 and collet 240.

The body portion 222 comprises a head 224 having two cylindrical protrusions 228 on opposing sides thereof. The body portion 222 also has a pin 230 with a frustoconical end portion 232 integrally formed at one end of the pin 230. A threaded portion 226 is provided between the pin 230 and the head 224.

The nut 236 has a thread 238, which cooperates with the thread 226 of the body portion 222. The collet 240 is provided in four segments 242 and at one end 244 each segment 242 is tapered to match the shaped frustoconical portion 232.

In operation, the bolt hole engaging device engages the bolt hole 72 by advancing the nut 236 along the threads 226 to the pin 230 axially with respect to the segments 242 and pull the tapered parts of the frustoconical portion 232 against the matching tapered end portion 244 to thereby expand the collet 240. Once the bolt hole engaging device 220 is forced against the bolt hole 72, the force transmission system 140 described for the second embodiment can be coupled around protrusions 228. The force transmission system 140 is operated to separate adjacent flanges 70 in the same manner as previously described for the second embodiment.

Modifications and improvements can be made without departing from the scope of the invention. For example, the angle of inclination of the tapered portions can be varied in order to adjust the amount radial expansion relative to the amount of axial travel of the expandable member or collet, and thereby change the force that must be applied in order to expand the device. The tools can be modified slightly to accommodate different collets which can be used interchangeably in combination with the different expender tools. For example, the body portion 38 can be provided with two frustoconical portions with the small diameter ends facing one another so that the collet 100 from the second embodiment that expands into a zigzag configuration can be used with the expander tool of the first embodiment.

The invention claimed is:

1. Apparatus for spreading flanges of pipes comprising:
   at least one bolt hole engaging device;
   a force transmission system arranged for selective coupling with the at least one bolt hole engaging device and capable of exerting a force thereon for selective movement of the flanges relative to one another,
   wherein the bolt hole engaging device comprises:
   an expandable member arranged so that in use it is at least partially accommodated within a bolt hole before expansion wherein an outer surface of the expandable member is provided with a gripping means; and
   an expander means arranged to expand the expandable member such that at least a portion of an outer surface of the expandable member is expanded to contact the bolt hole, wherein the force transmission system comprises a hydraulically operable ram having a piston configured to exert an axial force to separate the two bolt hole engaging devices that are attached to the flanges.

2. Apparatus according to claim 1, wherein the expander means comprises at least one wedge shaped member such as a frustoconical member and an actuator means for causing relative movement between the wedge shaped member(s) and the expandable member and wherein the wedge shaped member is arranged such that relative movement between the wedge shaped member and the expandable member causes the expandable member to expand.

3. Apparatus according to claim 2, wherein the actuator means comprises a screw-threaded device and acts to urge the expandable member axially relative to the wedge shaped member towards the larger diameter end of the wedge shaped member to radially expand the expandable member.

4. Apparatus according to claim 3, wherein the screw threaded device comprises a nut and a threaded portion provided on a part of the expander means, wherein the nut has a collar, which collar is arranged to engage an end face of the expandable member.

5. Apparatus according to claim 1, wherein a second bolt hole engaging device is provided for insertion into a bolt hole axially aligned with the first bolt hole.

6. Apparatus according to claim 1, wherein the expandable member is arranged to contact the bolt hole in at least three radially spaced points following expansion thereof.

7. Apparatus according to claim 1, wherein substantially an entire circumference of the expandable member is arranged to contact the bolt hole following expansion thereof.

8. Apparatus according to claim 1, wherein the expandable member has an inner bore to accommodate at least a portion of the expander means.

9. Apparatus according to claim 1, wherein the expandable member comprises a plurality of portions that are movable relative to one another to radially expand and engage the bolt hole.

10. Apparatus according to claim 9, wherein the portions have tapered inner bearing surfaces that are shaped to match an outer profile of the expander means.

11. Apparatus according to claim 1, wherein the expandable member has one or more slits extending through a sidewall thereof in order to allow for expansion of the expandable member.

12. Apparatus according to claim 11, wherein the slits extend from an end of the expandable member and are circumferentially spaced around the expandable member and circumferentially adjacent slits extend from alternate ends of the expandable member.

13. Apparatus according claim 1, wherein a single expander means is operable with several sizes of expandable members in order to engage different widths of bolt holes.

14. Apparatus according to claim 1, wherein the force transmission system comprises two arms that are each connectable to a respective bolt hole engaging device at one end and to a driving mechanism at the other end.

15. Apparatus according to claim 14, wherein the driving mechanism is a screw-threaded device that is capable of exerting an axial force to separate the two bolt hole engaging devices.

16. Apparatus for spreading flanges of pipes comprising:
at least one bolt hole engaging device;
a force transmission system arranged for selective coupling with the at least one bolt hole engaging device and capable of exerting a force thereon for selective movement of the flanges relative to one another,
wherein the bolt hole engaging device comprises:
an expandable member arranged so that in use it is at least partially accommodated within a bolt hole before expansion wherein an outer surface of the expandable member is provided with a gripping means; and
an expander means arranged to expand the expandable member such that at least a portion of an outer surface of the expandable member is expanded to contact the bolt hole;
wherein the force transmission system comprises two arms that are each connectable to a respective bolt hole engaging device at one end and to a driving mechanism at the other end; and wherein the force transmission system is provided with a spacer bar connectable between pivot points on the arms and wherein the length of the spacer bar is adjustable to suit the distance between the flanges and is lockable in a number of positions once the desired length has been determined.

17. Apparatus according to claim 16, wherein the length of the spacer bar is adjustable to alter a leverage force exerted by the force transmission system.

18. Apparatus according to claim 16, wherein the length of the driving mechanism is adjustable to enable use of the force transmission system on a range of flange widths.

19. Apparatus according to claim 1, wherein the or each bolt hole engaging device has a hydraulic piston chamber and a piston.

20. Apparatus according to claim 19, wherein each piston has an end face that is provided with a connection means to connect with an opposing piston.

21. A method for spreading flanges of pipes comprising the steps of:
providing a bolt hole engaging device comprising an expandable member having gripping means on an outer surface;
arranging the expandable member at least partially within a bolt hole on at least one of the flanges;
actuating an expander means to expand the outer surface and the gripping means of the expandable member into contact with the bolt hole;
providing a force transmission system to act on the bolt hole engaging device; and
actuating the force transmission system to exert a force on the bolt hole engaging device to move the flanges relative to one another; wherein the force transmission system comprises a hydraulically operable ram having a piston, and wherein the method includes actuating the piston to exert an axial force to separate the two bolt hole engaging devices that are attached to the flanges.

22. A method according to claim 21, including the step of providing a wedge shaped expander means, driving the frustoconical expander means and the expandable member relative to one another and thereby expanding the expandable member.

23. A method according to claim 22, including providing a threaded actuator means comprising a nut on a screw thread and including the step of turning a nut on a screw thread to cause the nut to act on the frustoconical expander means to move it relative to the expandable member.

24. Apparatus according to claim 1, wherein the expander means comprise two tapered surfaces having converging directions of taper, wherein the tapered surfaces are moveable relative to one another.

25. Apparatus as claimed in claim 24, wherein the expander means comprise two frustoconical elements that are moveable relative to one another.

26. Apparatus as claimed in claim 24, wherein the expandable member is arranged to be accommodated between the two flared ends of the tapered surface prior to expansion.

\* \* \* \* \*